(12) United States Patent
You et al.

(10) Patent No.: US 10,045,337 B2
(45) Date of Patent: Aug. 7, 2018

(54) METHOD AND TERMINAL FOR RECEIVING EPDCCH FROM SMALL CELL HAVING LOW TRANSMISSION POWER

(71) Applicant: LG ELECTRONICS INC., Seoul (KR)

(72) Inventors: Hyangsun You, Seoul (KR); Yunjung Yi, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 14/894,169

(22) PCT Filed: May 14, 2014

(86) PCT No.: PCT/KR2014/004315
§ 371 (c)(1),
(2) Date: Nov. 25, 2015

(87) PCT Pub. No.: WO2014/193104
PCT Pub. Date: Dec. 4, 2014

(65) Prior Publication Data
US 2016/0105874 A1    Apr. 14, 2016

Related U.S. Application Data

(60) Provisional application No. 61/829,270, filed on May 31, 2013.

(51) Int. Cl.
*H04W 72/04*    (2009.01)
*H04W 4/70*    (2018.01)
*H04L 5/00*    (2006.01)

(52) U.S. Cl.
CPC ......... *H04W 72/042* (2013.01); *H04L 5/0053* (2013.01); *H04L 5/001* (2013.01); *H04L 5/0073* (2013.01)

(58) Field of Classification Search
CPC .......... H04W 72/042; H04W 72/0446; H04W 52/325; H04L 5/001; H04L 5/0073
(Continued)

(56) References Cited

U.S. PATENT DOCUMENTS 9,591,635 B2 * 3/2017 Sartori ................. H04L 5/0053
2012/0275400 A1 * 11/2012 Chen ................... H04J 11/0033
370/329

(Continued)

FOREIGN PATENT DOCUMENTS

KR    10-2011-0086246 A    7/2011
WO    2013/077678    5/2013

OTHER PUBLICATIONS

LG Electronics, "Considerations on ICIC Enhancements with EPDCCH considered in small cell", R1-132237, 3GPP TSG RAN WG1 Meeting #73, Fukuoka, Japan, May 20-24, 2013, See pp. 1-3.

(Continued)

*Primary Examiner* — Charles C Jiang
*Assistant Examiner* — Will Lin
(74) *Attorney, Agent, or Firm* — Dentons US LLP

(57) ABSTRACT

In one disclosure of the present invention, a method is provided for receiving an enhanced physical downlink control channel (EPDCCH) from a small cell having low transmission power. The receiving method may comprise the steps of: receiving EPDCCH-PRB set information including information about a physical resource block (PRB) that will receive the EPDCCH from the small cell; and determining a subframe that will be received by the EPDCCH from the small cell on the PRB checked by the EPDCCH-PRB set information. Here, the subframe that may be received by the EPDCCH from the small cell may be (Continued)

determined so as not to overlap a subframe transmitted by the EPDCCH by means of one or a plurality of neighboring cells.

12 Claims, 22 Drawing Sheets

(58) Field of Classification Search
USPC .................................................. 370/329, 330
See application file for complete search history.

(56) References Cited

U.S. PATENT DOCUMENTS

| | | | | |
|---|---|---|---|---|
| 2013/0242947 A1* | 9/2013 | Chen | ..................... | H04W 72/04 370/335 |
| 2013/0250882 A1* | 9/2013 | Dinan | ............... | H04W 72/0426 370/329 |
| 2014/0092821 A1* | 4/2014 | Zhu | .................. | H04W 52/0258 370/329 |
| 2014/0233407 A1* | 8/2014 | Pourahmadi | .......... | H04L 5/0007 370/252 |
| 2015/0373731 A1* | 12/2015 | Quan | .................... | H04W 16/10 370/329 |
| 2016/0278060 A1* | 9/2016 | Zhu | .................. | H04W 52/0258 |

OTHER PUBLICATIONS

LG Electronics, "Inter-cell coordination for efficient small cell operation", R1-131302, 3GPP TSG RAN WG1 Meeting #72b, Chicago, USA., Apr. 15-19, 2013 See pp. 1-5.
LG Electronics et al., "CR on collision between EPDCCH and PSS/SSS/PBCH", R1-132694, 3GPP TSG RAN WG1 Meeting #73, Fukuoka, Japan, May 20-24, 2013 See pp. 1-3.

* cited by examiner

FIG. 16A

| 3 | 3 | 3 | 3 | 3 |   |   | 3 | 3 | 3 | 3 | 3 |   |   |
| 2 | 2 | 2 | 2 | 2 |   |   | 2 | 2 | 2 | 2 | 2 |   |   |
| 1 | 1 | 1 | 1 | 1 | 1 | 3 | 1 | 1 | 1 | 1 | 1 | 1 | 3 |
| 0 | 0 | 0 | 0 | 0 | 0 | 2 | 0 | 0 | 0 | 0 | 0 | 0 | 2 |
| 3 | 3 | 3 | 3 | 3 | 3 | 1 | 3 | 3 | 3 | 3 | 3 | 3 | 1 |
| 2 | 2 | 2 | 2 | 2 |   |   | 2 | 2 | 2 | 2 | 2 |   |   |
| 1 | 1 | 1 | 1 | 1 |   |   | 1 | 1 | 1 | 1 | 1 |   |   |
| 0 | 0 | 0 | 0 | 0 | 2 | 0 | 0 | 0 | 0 | 0 | 0 | 2 | 0 |
| 3 | 3 | 3 | 3 | 3 | 1 | 3 | 3 | 3 | 3 | 3 | 3 | 1 | 3 |
| 2 | 2 | 2 | 2 | 2 | 0 | 2 | 2 | 2 | 2 | 2 | 2 | 0 | 2 |
| 1 | 1 | 1 | 1 | 1 |   |   | 1 | 1 | 1 | 1 | 1 |   |   |
| 0 | 0 | 0 | 0 | 0 |   |   | 0 | 0 | 0 | 0 | 0 |   |   |

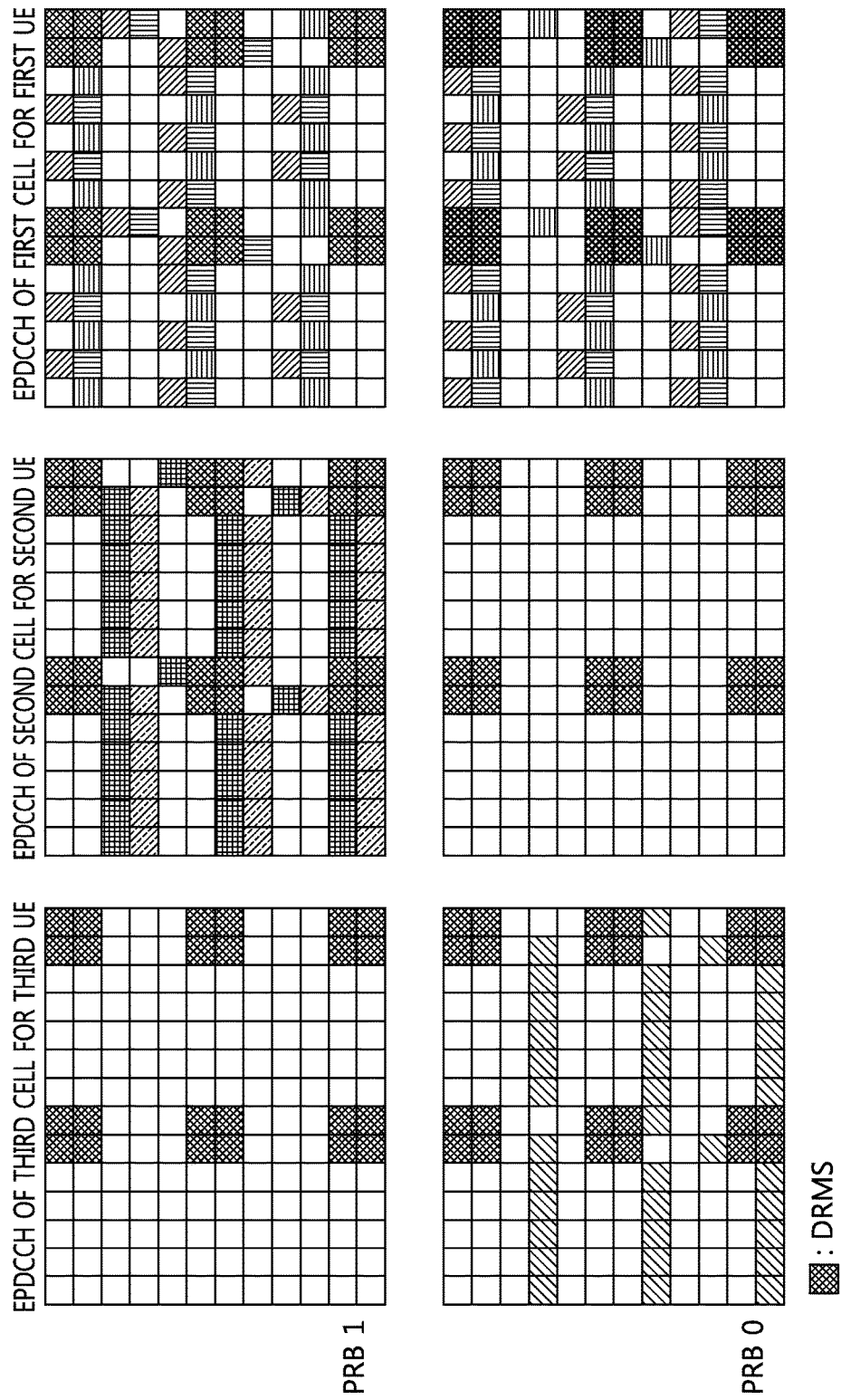

METHOD AND TERMINAL FOR RECEIVING EPDCCH FROM SMALL CELL HAVING LOW TRANSMISSION POWER

This application is a National Stage Application of International Application No. PCT/KR2014/004315, filed on May 14, 2014, which claims the benefit of U.S. Provisional Application No. 61/829,270, filed on May 31, 2013, all of which are hereby incorporated by reference in their entirety for all purposes as if fully set forth herein.

BACKGROUND OF THE INVENTION

Field of the Invention

The present invention relates to mobile communication.

Discussion of the Related Art

3GPP (3rd Generation Partnership Project) LTE (Long Term Evolution) that is an advancement of UMTS (Universal Mobile Telecommunication System) is being introduced with 3GPP release 8. The 3GPP LTE uses orthogonal frequency division multiple access (OFDMA) in a downlink and uses single carrier-frequency division multiple access (SC-FDMA) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, the PDCCH is monitored in a limited region called a control region in the subframe and further, a CRS which is transmitted in an entire band is used to demodulate the PDCCH. As the type of control information is diversified and the amount of the control information increases, the flexibility of scheduling deteriorates only by the existing PDCCH. Further, an enhanced PDCCH (EPDCCH) is introduced in order to reduce a burden caused by the CRS transmission.

On the other hand, in a next-generation mobile communication system, it is predicted that a small cell having small cell coverage will be added into coverage of a macro cell.

However, when multiple small cells transmit the EPDCCH onto the same PRB, the multiple small cells can interfere with each other.

SUMMARY OF THE INVENTION

Accordingly, the disclosure of the specification has been made in an effort to solve the problem.

In order to achieve the aforementioned object, the present invention provides a method for receiving an enhanced physical downlink control channel (EPDCCH) from a small cell having low-power transmission power. The method may comprise: receiving EPDCCH-physical resource block (PRB) set information including information about a PRB on which the EPDCCH is to be received from the small cell; and determining a subframe in which the EPDCCH is to be received on the PRB checked by the EPDCCH-PRB set information from the small cell. The subframe in which the EPDCCH is to be received from the small cell may be determined so as not to overlap a subframe used, by one or a plurality of neighboring cells, to transmit the EPDCCH.

The PRB on which the EPDCCH is received may be determined by the unit of a set of PRBs, a bundle of PRBs, or a group of PRBs.

When the total number of the small cell and the neighboring cells may be M and a cell index of the small cell may be m, the subframe may be a subframe having an index k satisfying m=(k mod M).

In a subframe other than a subframe determined to receive the EPDCCH, zero-power transmission may be performed by the small cell on the PRB. In the subframe determined to receive the EPDCCH from the small cell, the zero-power transmission may be performed by one or the plurality of neighboring cells.

In order to achieve the aforementioned object, the present invention provides a method for transmitting an enhanced physical downlink control channel (EPDCCH) from a small cell having low-power transmission power. The method may comprise: determining a physical resource block (PRB) on which the small cell is to transmit the EPDCCH; and determining a subframe in which the small cell is to transmit the EPDCCH on the determined PRB. The subframe may be determined so as not to overlap with a subframe in which the EPDCCH is transmitted by one or a plurality of neighboring cells.

The PRB on which the EPDCCH may be transmitted is determined by the unit of a set of PRBs, a bundle of PRBs, or a group of PRBs.

The method may further comprise: transmitting to a terminal EPDCCH-PRB set information including information about a PRB determined to transmit the EPDCCH.

When the total number of the small cell and the neighboring cells is M and a cell index of the small cell is m, the subframe is a subframe having an index k satisfying m=(k mod M).

In a subframe other than a subframe determined to transmit the EPDCCH, zero-power transmission may be performed by the small cell on the PRB. In the subframe determined to transmit the EPDCCH, the zero-power transmission may be performed by one or the plurality of neighboring cells.

In order to achieve the aforementioned object, the present invention provides a method for receiving an enhanced physical downlink control channel (EPDCCH) from a small cell having low-power transmission power. The method may comprise: receiving EPDCCH-physical resource block (PRB) set information including information about a PRB on which the EPDCCH is to be received from the small cell; and determining a subframe in which the EPDCCH is to be received on the PRB checked by the EPDCCH-PRB set information from the small cell. The subframe in which the EPDCCH is to be received from the small cell may be determined so as not to overlap a subframe used, by one or a plurality of neighboring cells, to transmit the EPDCCH.

According to the disclosure of the specification, the problem in the related art is solved.

BRIEF DESCRIPTION OF THE DRAWINGS

FIGS. 16A to 16C illustrate one example related to the interference management of the ECCE unit based EPDCCH according to the third disclosure of the present specification.

DETAILED DESCRIPTION OF THE EMBODIMENTS

Figure 1:
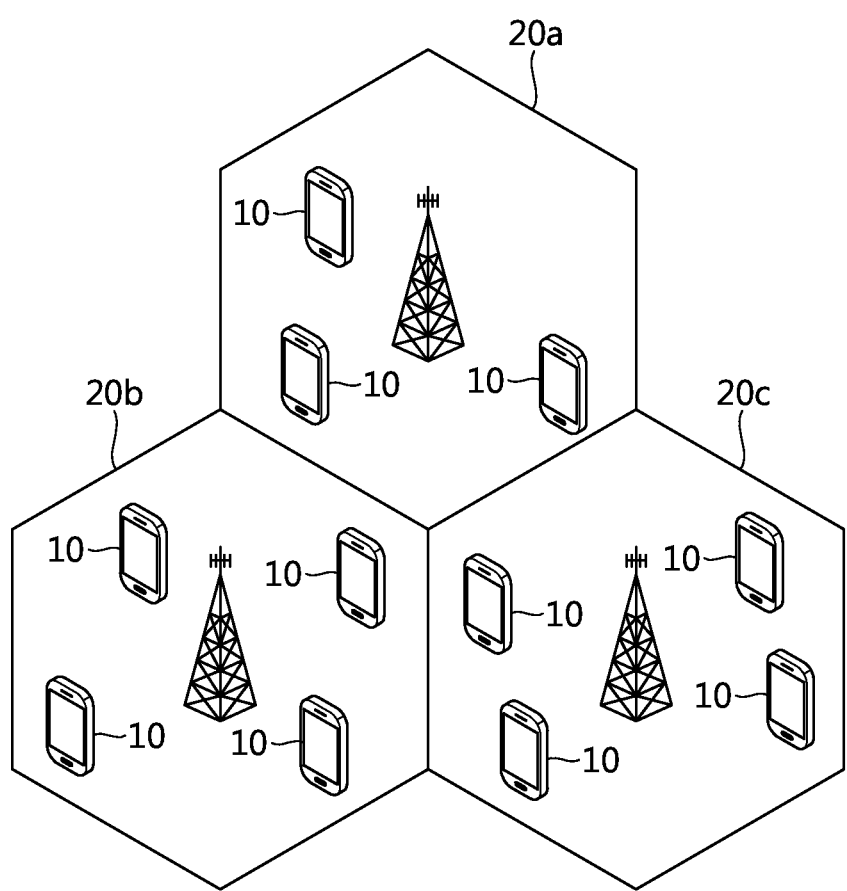
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
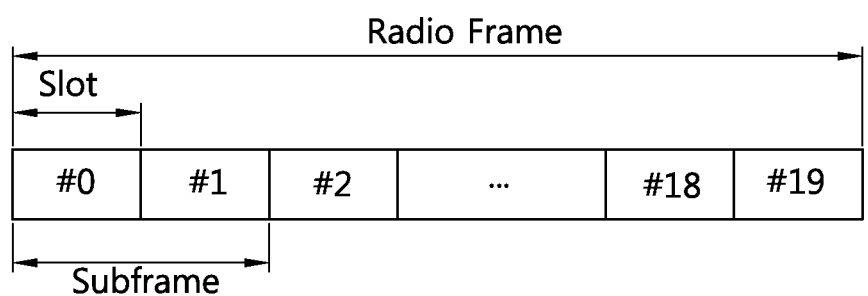
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. This may refer to a chapter 6 of 3GPP TS 36.211 V10.4.0 (2011-16) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
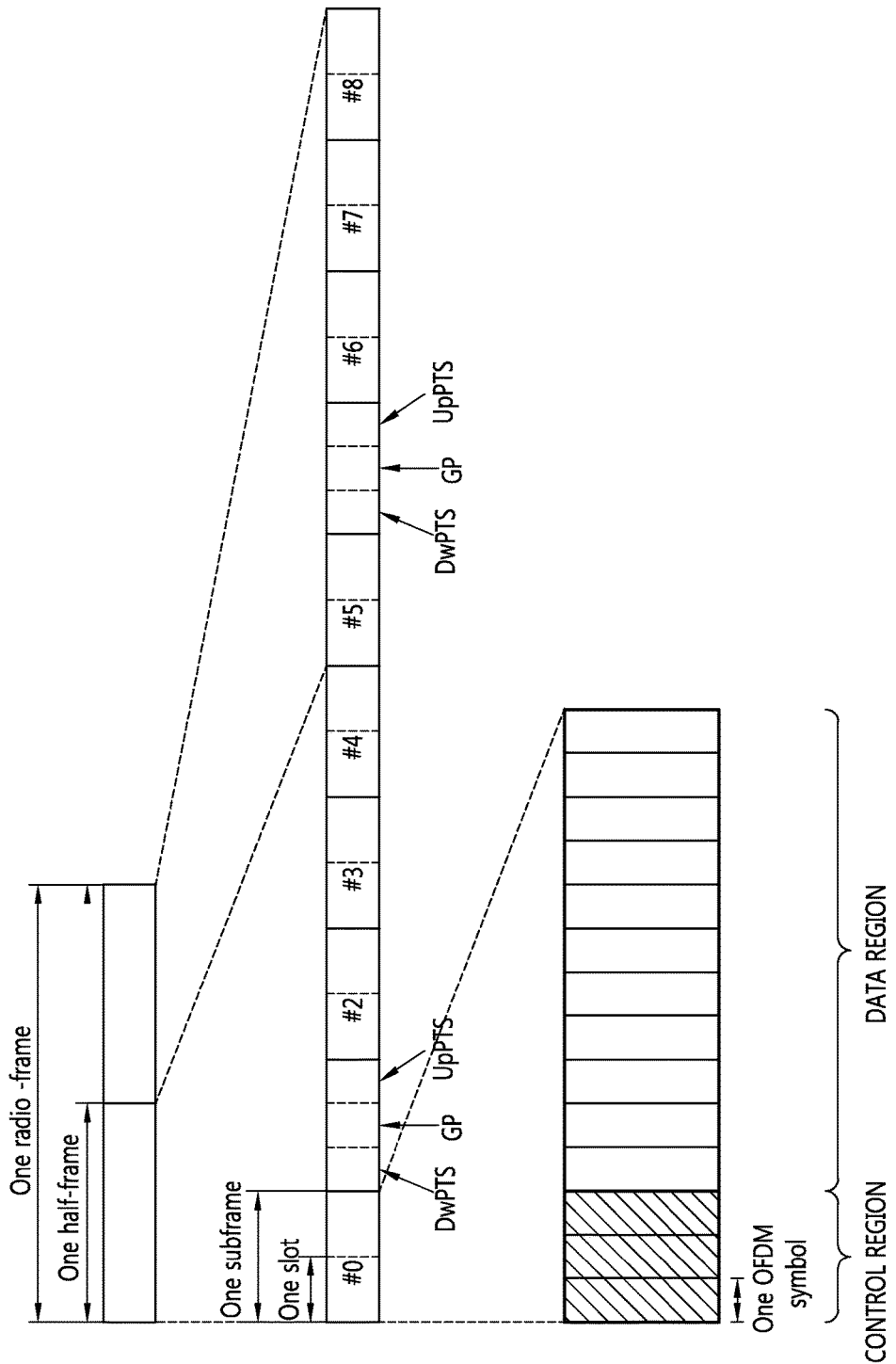
FIG. 3 illustrates the architecture of a downlink radio frame according to time division duplex (TDD) in 3GPP LTE.

FIG. 3 shows an example of a resource grid for one uplink or downlink slot in 3GPP LTE.

This may refer to a chapter 6 of 3GPP TS 36.211 V10.4.0 (2011-16) "Evolved Universal Terrestrial Radio Access (E-UTRA); Physical Channels and Modulation (Release 8)". 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D CELL ANALYSIS DEVICE | S: Area | U | U | U | D CELL ANALYSIS DEVICE | S: Area | U | U | U |
| 1 | 5 ms | D CELL ANALYSIS DEVICE | S: Area | U | U | D CELL ANALYSIS DEVICE | D CELL ANALYSIS DEVICE | S: Area | U | U | D CELL ANALYSIS DEVICE |
| 2 | 5 ms | D CELL ANALYSIS DEVICE | S: Area | U | D CELL ANALYSIS DEVICE | D CELL ANALYSIS DEVICE | D CELL ANALYSIS DEVICE | S: Area | U | D CELL ANALYSIS DEVICE | D CELL ANALYSIS DEVICE |
| 3 | 10 ms | D CELL ANALYSIS DEVICE | S: Area | U | U | U | D CELL ANALYSIS DEVICE | D CELL ANALYSIS DEVICE | D CELL ANALYSIS DEVICE | D CELL ANALYSIS DEVICE | D CELL ANALYSIS DEVICE |
| 4 | 10 ms | D CELL ANALYSIS DEVICE | S: Area | U | U | D CELL ANALYSIS DEVICE | D CELL ANALYSIS DEVICE | D CELL ANALYSIS DEVICE | D CELL ANALYSIS DEVICE | D CELL ANALYSIS DEVICE | D CELL ANALYSIS DEVICE |
| 5 | 10 ms | D CELL ANALYSIS DEVICE | S: Area | U | D CELL ANALYSIS DEVICE | D CELL ANALYSIS DEVICE | D CELL ANALYSIS DEVICE | D CELL ANALYSIS DEVICE | D CELL ANALYSIS DEVICE | D CELL ANALYSIS DEVICE | D CELL ANALYSIS DEVICE |
| 6 | 5 ms | D CELL ANALYSIS DEVICE | S: Area | U | U | U | D CELL ANALYSIS DEVICE | S: Area | U | U | D CELL ANALYSIS DEVICE |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
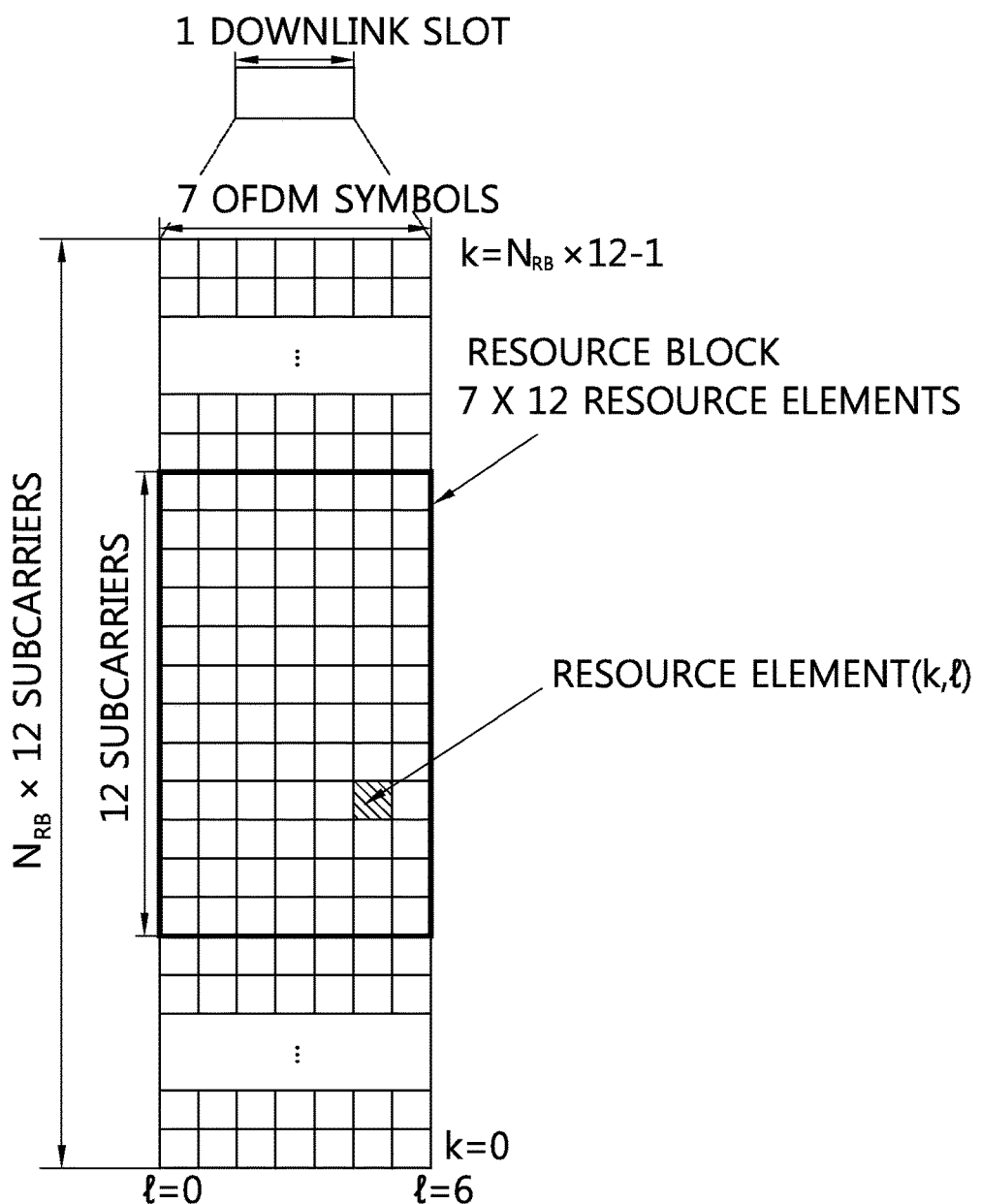
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
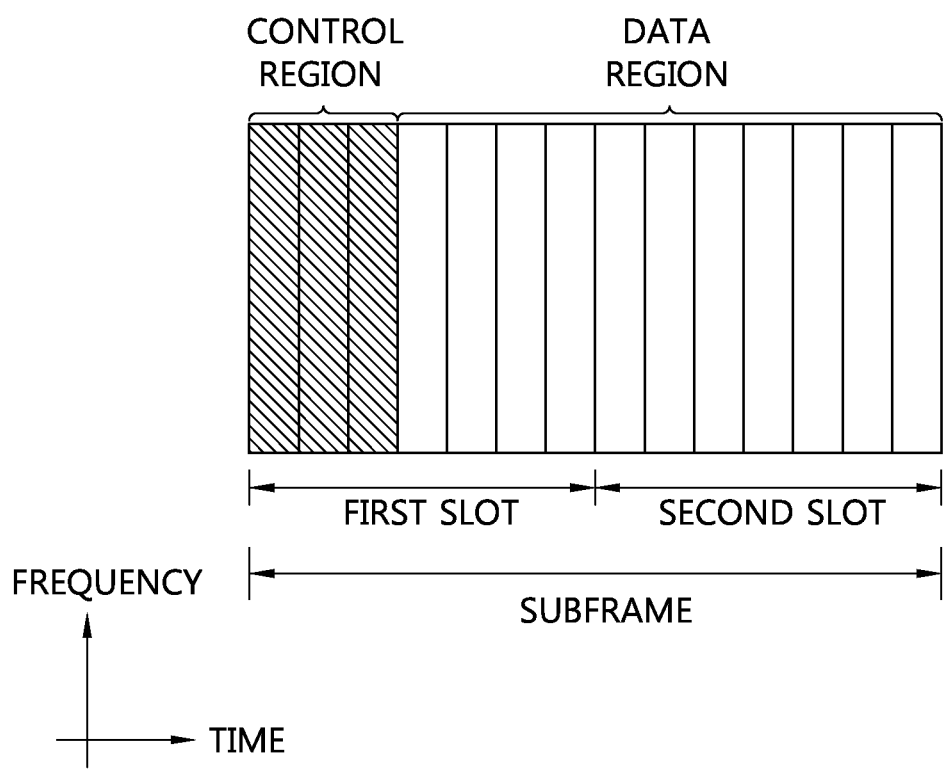
FIG. 5 illustrates the architecture of a downlink subframe.

FIG. 5 illustrates the architecture of a downlink sub-frame.

Figure 8:
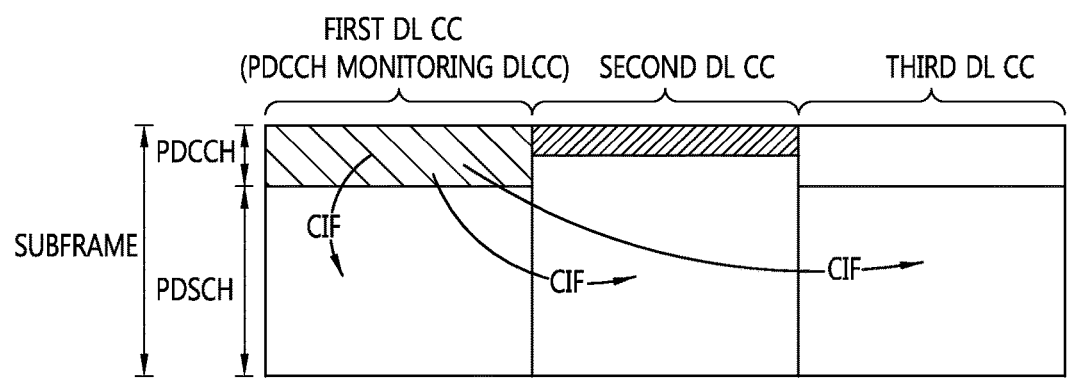
FIG. 8 exemplifies cross-carrier scheduling in a carrier aggregation system.

[FIG. 8] 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH transports an ACK (positive-acknowledgement)/NACK (negative-acknowledgement) signal for the hybrid automatic repeat (HARM) signal. The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
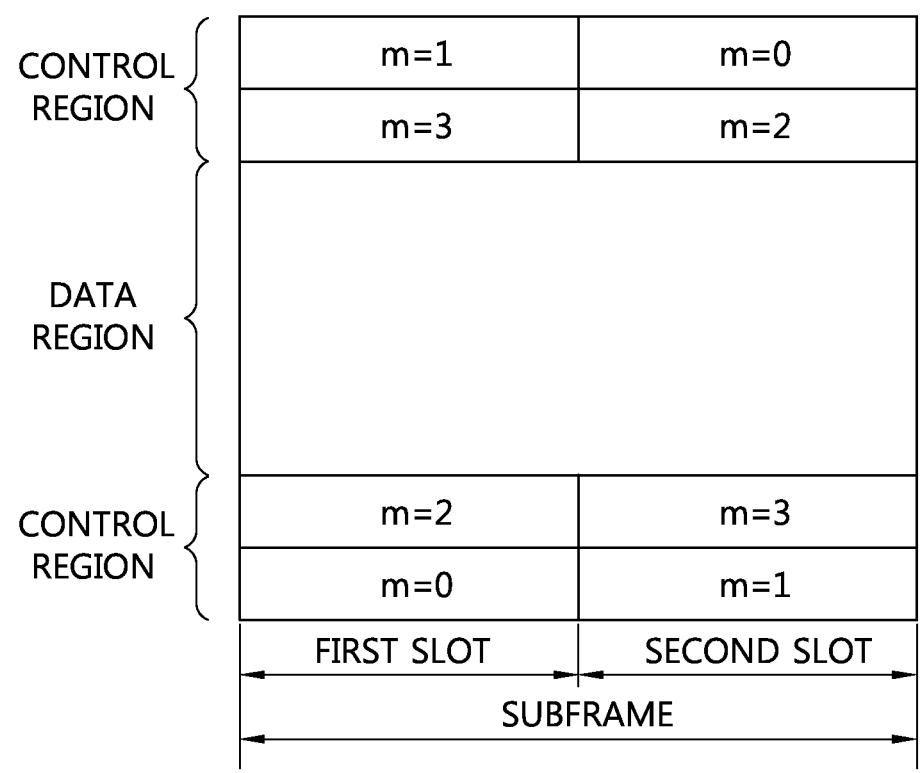
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
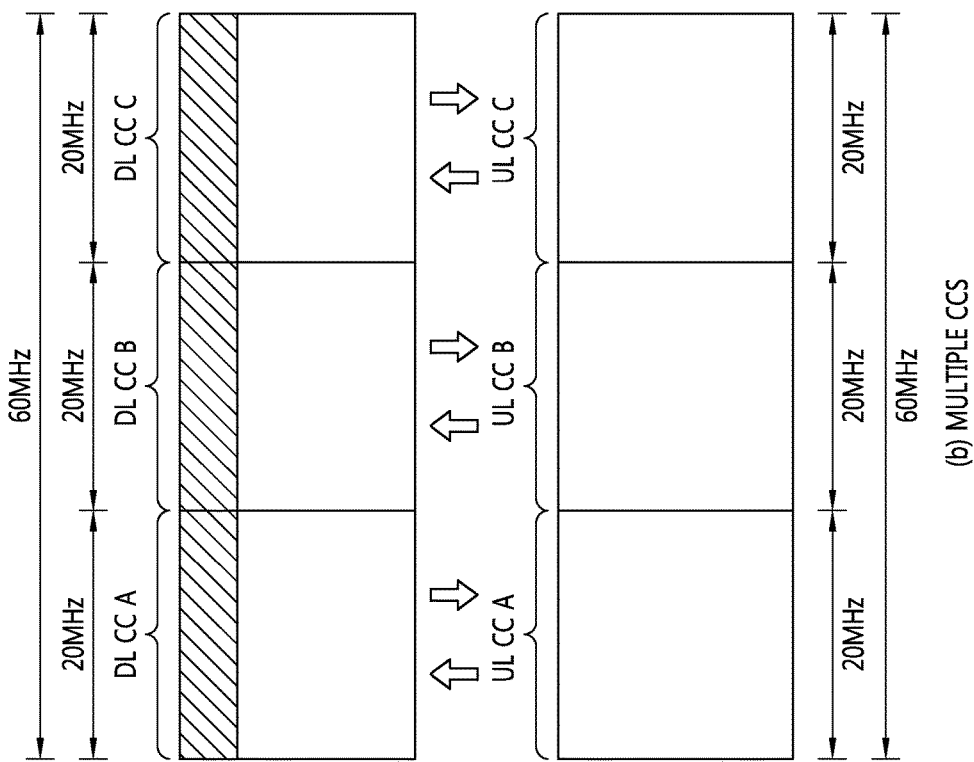
FIG. 7 illustrates an example of comparison between a single carrier system and a carrier aggregation system.
Figure 7:
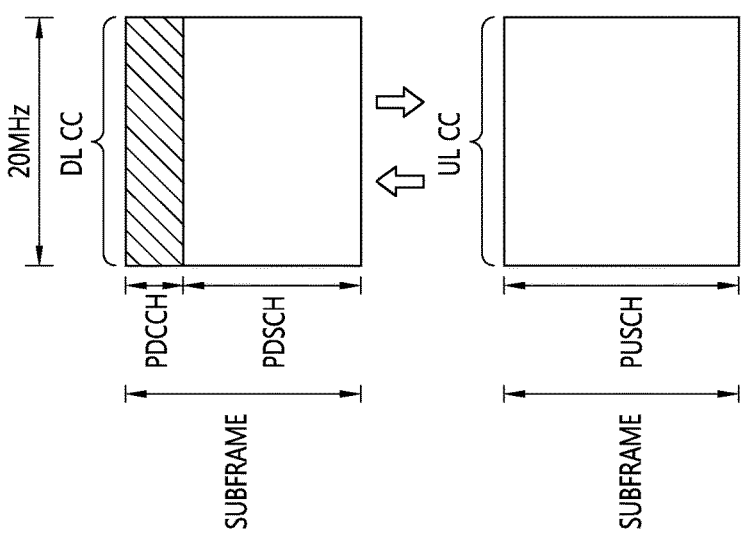

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

[FIG. 8] 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, the PDCCH is monitored in a limited region called a control region in the subframe and further, a CRS which is transmitted in an entire band is used to demodulate the PDCCH. As a type of control information is diversified and the amount of the control information increases, the flexibility of scheduling deteriorates only by the existing PDCCH. Further, an enhanced PDCCH (EPDCCH) is introduced in order to reduce a burden caused by the CRS transmission.

Figure 9:
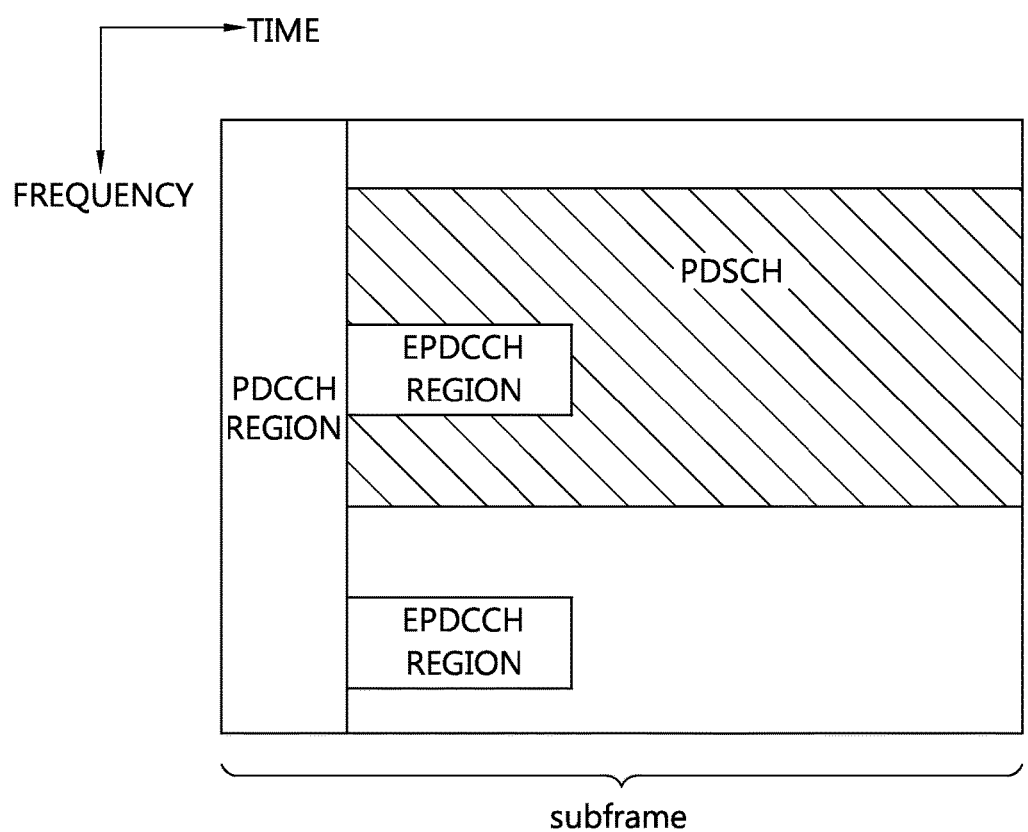
FIG. 9 illustrates one example of a subframe including an EPDCCH.

FIG. 9 illustrates one example of a subframe including an EPDCCH.

The subframe may include 0 or one PDCCH region and one or more EPDCCH regions.

The EPDCCH region is a region in which the wireless equipment monitors the EPDCCH. The PDCCH region is positioned in a maximum of four former OFDM symbols of the subframe, but the EPDCCH region may be flexibly scheduled in the OFDM symbol after the PDCCH region.

One or more EPDCCH regions may be designated in wireless equipment and the wireless equipment may monitor the EPDCCH in the designated EPDCCH region.

The base station may notify to the wireless equipment information regarding the number/positions/sizes of the EPDCCH regions and/or the subframe in which the EPDCCH is to be monitored through an RRC message, and the like.

In the PDCCH region, the PDCCH may be demodulated based on the CRS. In the EPDCCH region, not the CRS but a demodulation (DM) RS may be defined in order to demodulate the EPDCCH. The associated DM RS may be transmitted in the corresponding EPDCCH region.

Each EPDCCH region may be used in scheduling for different cells. For example, the EPDCCH in the EPDCCH region may transport scheduling information for a primary cell and the EPDCCH in the EPDCCH region may transport scheduling information for a secondary cell.

When the EPDCCH in the EPDCCH region is transmitted through multiple antennas, the same precoding as the EPDCCH may be applied to the DM RS in the EPDCCH region.

A transmission resource unit for the EPCCH is referred to as an enhanced control channel element (ECCE) compared with the case in which the PDCCH uses the CCE by the unit of the transmission resource. The aggregation level may be defined by the unit of the resource monitoring the ePDCCH. For example, when 1 ECCE is a minimum resource for the EPDCCH, the aggregation level may be defined like L={1, 2, 4, 8, 16}.

As illustrated in FIG. 9, the EPDCCH is transmitted to the existing PDSCH and it is characterized in that a beamforming gain and a spatial diversity gain may be acquired according to a transmission pattern. Further, since the EPDCCH transmits the control information, higher reliability requires reliability than data transmission and a concept such as an aggregation level, or the like is used so as to reduce a coding rate. Since a high aggregation level may reduce the coding rate, demodulation accuracy may increase, but there is a disadvantage in which a capability decreases due to an increase in the number of used resources.

Figure 10A:
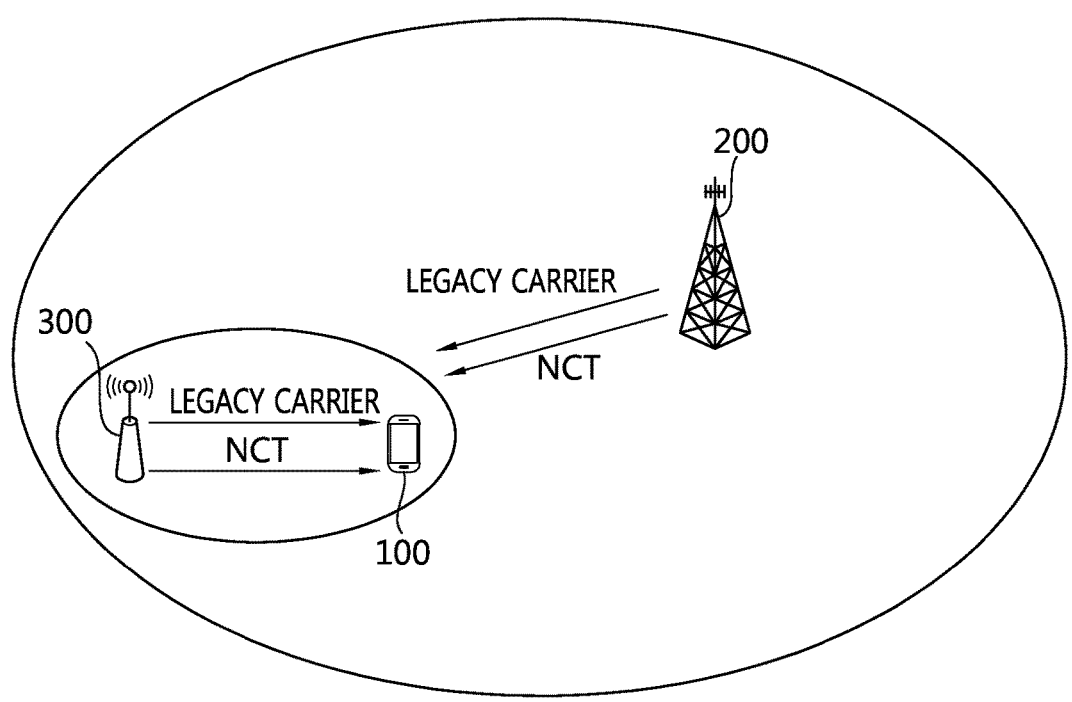
FIG. 10A exemplarily illustrates a new carrier for a next-generation wireless communication system.

FIG. 10A exemplarily illustrates a new carrier for a next-generation wireless communication system.

In the existing 3GPP LTE/LTE-A based wireless communication system, a reference signal, a synchronization signal, a control channel, and the like are transmitted through a downlink carrier. As such, the downlink carrier based on the 3GPP LTE/LTE-A is referred to as a legacy carrier. However, in the next-generation wireless communication system after LTE-LTE-A, a new carrier for alleviating interference among a plurality of serving cells and extensibility of the carrier may be introduced. This is referred to as an extension carrier or a new carrier type (NCT). A cell based on the extension carrier is referred to as an extension cell.

The NCT may be used by the existing macro cell 200. Further, the NCT is positioned in coverage of the existing macro cell 200 and may be used by one or more small cells 300 (alternatively, referred to as a pico cell, a femto cell, or a micro cell) having low-power transmission power.

The NCT may be used as the primary cell (that is, PCell), but it is considered that the NCT is primarily used only as a secondary cell (that is, SCell) together with the primary cell (that is, PCell) having the existing type. When in the primary cell (that is, PCell), the subframe having the existing type is used and in the secondary cell (that is, SCell), an NCT subframe is used, a configuration for the subframe may be signaled through the secondary cell (that is, SCell). The secondary cell (that is, SCell) in which the NCT subframe is used, may be activated by the primary cell (that is, PCell).

When the NCT is used only as the secondary cell as described above, since the existing UEs are not considered, the existing UEs need not perform cell detection, cell selection, and cell reselection of the secondary cell using the NCT. Further, since the NCT used only as the secondary cell may not be recognized by the existing UEs, unnecessary elements may be reduced as compared with the existing secondary cell, and as a result, a more efficient operation becomes enabled.

Further, in the NCT, transmission of the CRS which is transmitted at fixed high density is omitted or significantly scaled down. In the legacy carrier, the CRS is transmitted in all downlink subframes through an entire system band, while in the NCT, the CRS may not be transmitted or in a specific downlink subframe through a part of the system band. Therefore, in the NCT, the CRS may not be used for demodulation and used only synchronization tracking and for this reason, the CRS may be called a tracking RS (TRS) or an enhanced synchronization signal (eSS) or a reduced CRS (RCRS).

The TRS may be transmitted through one RS port. The TRS may be transmitted through an entire frequency band or a partial frequency band.

In the legacy carrier, the PDCCH is modulated based on the CRS, but in the NCT, the PDCCH may not be transmitted. In the NCT, only a DMRS (alternatively, URS) is used for data demodulation.

Accordingly, the UE receives downlink data based on the DMRS (alternatively, URS) and measures a channel state based on a CSI-RS transmitted at a relatively low frequency.

When the NCT is used, overhead caused due to a reference signal is minimized, and as a result, a reception capability may be improved and a radio resource may be efficiently used.

Figure 10B:
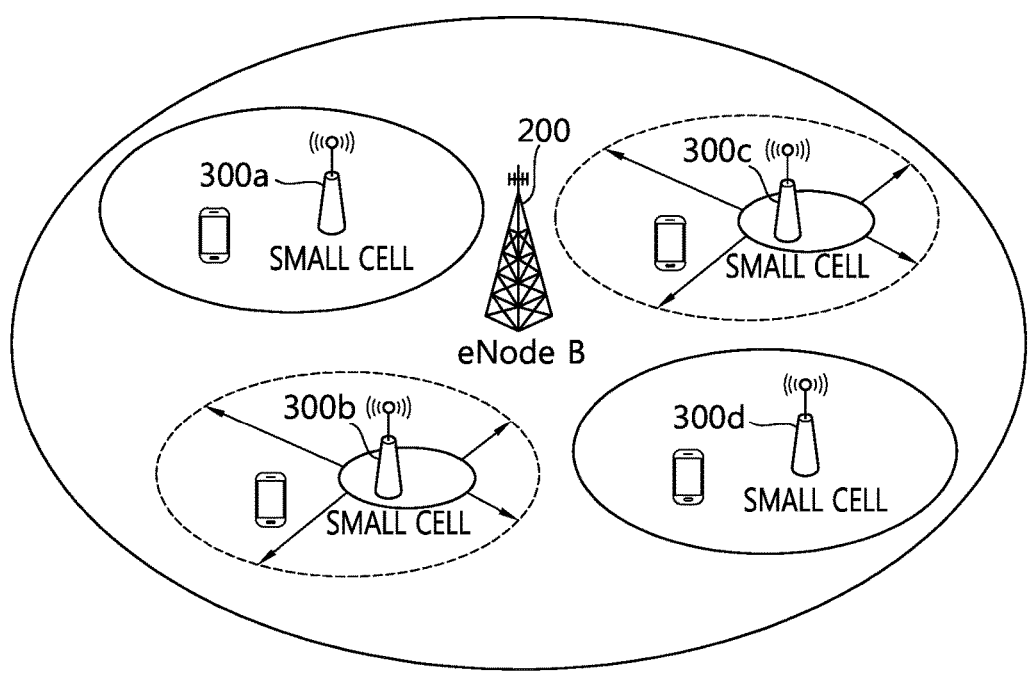
FIG. 10B is a diagram illustrating an environment of heterogeneous networks in which a macro cell and a small cell are mixed which may be a next-generation wireless communication system.

FIG. 10B is a diagram illustrating an environment of heterogeneous networks in which a macro cell and a small cell are mixed which may be a next-generation wireless communication system.

Referring to FIG. 10B, a heterogeneous network environment is shown, in which a macro cell overlaps with one or more small cells 300a, 300b, 300c, and 300d. A service of the macro cell 200 is provided by a macro base station (macro eNodeB, MeNB). In the present specification, the macro cell and the macro base station may be mixedly used. UE that accesses the macro cell 200 may be designated as macro UE. The macro UE receives a downlink signal from the macro base station and transmits an uplink signal to the macro base station.

In such a heterogeneous network, the macro cell is established as a primary cell (Pcell) and the small cell is established as a secondary cell (Scell) to fill a coverage gap of the macro cell. Further, the small cell is established as the primary cell (Pcell) and the macro cell is established as the secondary cell (Scell) to boost an overall capability.

On the other hand, the small cell may currently use a frequency band assigned as LTE/LTE-A or a higher frequency band (for example, a band of 3.5 GHz or higher).

On the other hand, in a future LTE-A system, it is considered even that the small cell may not be independently used and is used only as a macro-assisted small cell which may be used under assistance of the macro cell.

The small cells 300a, 300b, 300c, and 300d may have similar channel environments and since the small cells 300a, 300b, 300c, and 300d are positioned at distances approximate to each other, interference among the small cells may be a big issue.

In order to reduce the interference influence, the small cells 300b and 300c may extend or scale down coverages thereof. As such, the extension and the scaling-down of the coverages are referred to as cell breathing. For example, as illustrated in FIG. 10B, the small cells 300b and 300c may be turned on or off depending on the situation.

However, when the multiple small cells transmit the EPDCCH onto the same PRB, the multiple small cells may interfere with each other.

<Scheme According to One Disclosure of the Present Specification>

Therefore, hereinafter, when various small cells transmit the EPDCCH onto the same PRB, a method for performing interference management by the EPDCCH is proposed. The interference management of the EPDCCH may be referred to as EPDCCH inter cell interference coordination (ICIC).

Herein, in the case where the PDSCH of a neighboring cell is a source of the interference and in the case where the EPDCCH is the source of the interference, different interference alleviation techniques may be required. That is, in the case where the EPDCCH of the neighboring cell is the source of the interference, a characteristic of the interference varies for each ECCE (alternatively, for EREG) even in one pair of PRBs and it may be difficult to distinguish different interferences in the PRB pair due to the characteristic of the EPDCCH.

Hereinafter, EPDCCH interference management among the small cells is primarily described, but the description may be applied even to EPDCCH interference management among the macro cells or between the macro cell and the small cell.

Figure 11:
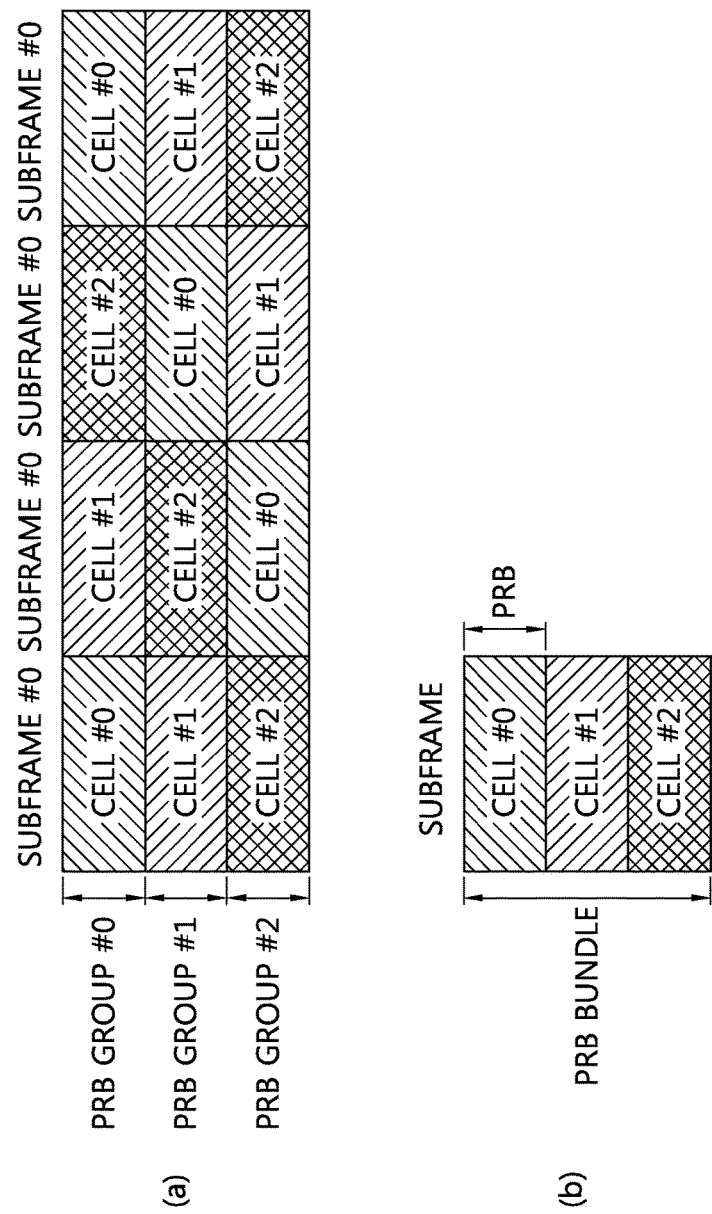
FIG. 11 illustrates one example related to interference management of a subframe unit based EPDCCH according to a first disclosure of the present specification.

FIG. 11 illustrates one example related to interference management of a subframe unit based EPDCCH according to a first disclosure of the present specification.

According to the first disclosure of the present specification, in order to transmit resources transmitting the EPDCCH among the cells not to overlap with each other, first, it may be considered that cells capable of transmitting the EPDCCH are differently designated by the unit of the subframe in a specific RB region. That is, for example, an index m of the cell capable of transmitting the EPDCCH through subframe #k among M cells having cell indexes m=0, 1, . . . , M−1 in the specific RB region may be determined according to (k mod M).

When the cell capable of transmitting the EPDCCH are differently configured for each subframe with respect to the specific RB region, the cell capable of transmitting the EPDCCH in a specific subframe may be differently configured for each PRB or for each PRB group. For example, when the PRB region in which the EPDCCH may be transmitted is divided into a plurality of PRB groups or PRB bundles as illustrated in FIG. 11A, the index m of the cell capable of transmitting the EPDCCH through PRB group/PRB bundle #g of subframe #k among M cells having the cell index m=0, 1, . . . , M−1 may be determined according to (k+g)mod M. Herein, the PRB group or the PRB bundle may be constituted by one PRB.

Alternatively, the PRB region (a PRB set for the EPDCCH) of the EPDCCH which specific UE in a specific cell will use may be configured as multiple PRB bundles or PRB groups. For example, as illustrated in FIG. 11B, in the corresponding PRB bundle or PRB group, the PRB region in which the EPDCCH for the specific UE in the specific cell may be actually constituted by some PRBs in the corresponding PRB bundle or PRB group. For example, cell #1 may announce to the UE that needs to receive the EPDCCH that the EPDCCH may be transmitted onto a specific PRB bundle or PRB group. In this case, a substantial PRB region in which the UE receives the EPDCCH from cell #1 may be some PRBs in the corresponding PRB bundle or PRB group. In this case, some PRB regions in which the UE receives the EPDCCH in the PRB bundle or the PRB group may vary depending on an ID of the cell. For example, in the PRB bundle or PRB group constituted by M PRBs, an index of the PRB region in which the UE may receive the EPDCCH may be determined according to cell ID mod M. In this case, some PRB regions in which the UE receives the EPDCCH in the PRB bundle or the PRB group may vary depending on an ID of the cell.

Meanwhile, among the cells that perform the EPDCCH ICIC, a cell which is not configured to perform the EPDCCH ICIC in the specific PRB region of the specific subframe may not transmit the EPDCCH in the corresponding PRB region and further, zero-power transmission may be performed while another signal/channel is not transmitted in the corresponding PRB region. In this case, the cell which is not configured to perform the EPDCCH ICIC in the specific PRB region of the specific subframe may need to perform the zero-power transmission while not transmitting another signal/channel other than the CRS or TRS in the corresponding PRB region.

Figure 12:
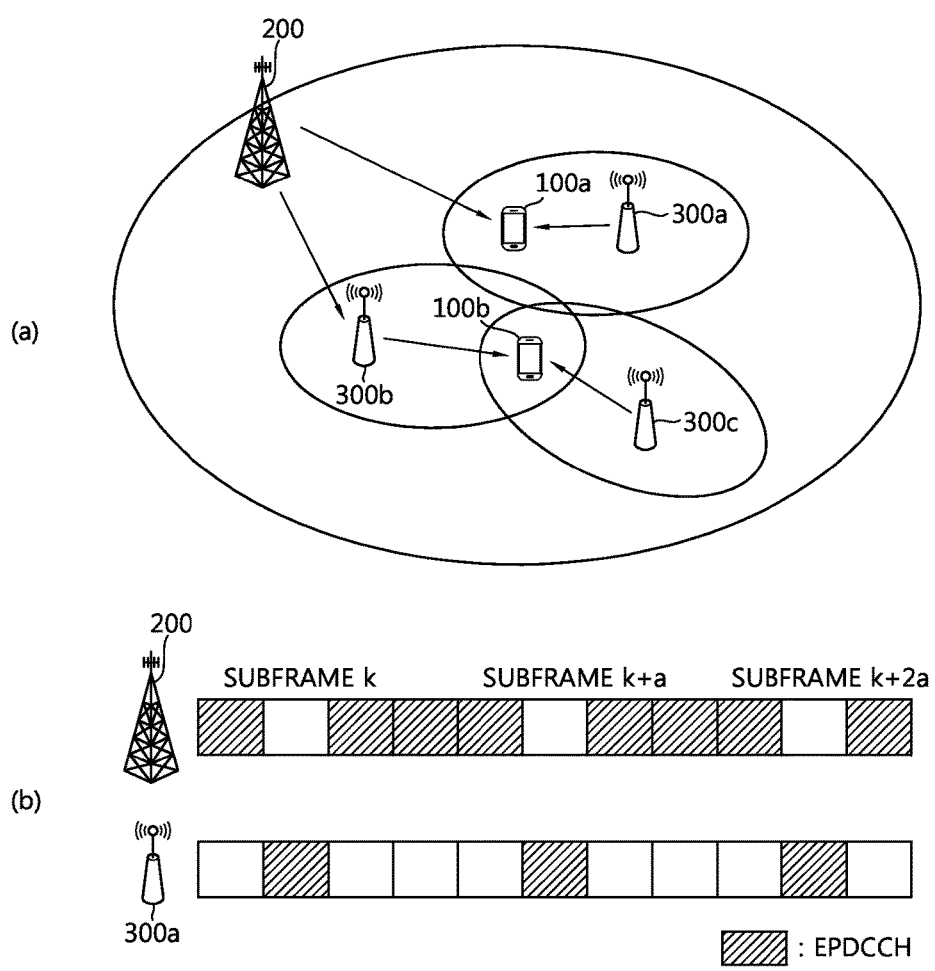
FIG. 12 illustrates an example in which the interference management of the subframe unit based EPDCCH according to the first disclosure of the present specification illustrated in FIG. 11 is applied.

FIG. 12 illustrates an example in which the interference management of the subframe unit based EPDCCH according to the first disclosure of the present specification illustrated in FIG. 11 is applied.

As illustrated in FIG. 12A, when the macro cell 200 and the small cells 300a, 300b, and 300c coexist, the macro cell may operates as the primary cell (Pcell) of the UE and the small cell may be configured as the secondary cell (Scell). In an example illustrated in FIG. 12A, first UE 100a uses the macro cell 300 as the primary cell and uses the first small cell 300a as the secondary cell. Further, second UE 100b uses the macro cell 300 as the primary cell and uses the third small cell 300c as the secondary cell. In this case, each of the small cells may be configured to transmit the EPDCCH through only the specific subframe for the EPDCCH ICIC among the small cells. Further, the second small cell 300b may serve to assist the macro cell 200.

When the plurality of small cells 300a, 300b, and 300c that interfere with each other on a coexistence channel, an EPDCCH resource to be used in each cell through bakhaul signaling among cells that operate/control each cell may be adjusted in order to perform the EPDCCH ICIC technique according to the first disclosure. In detail, the macro cell 200 may announce information on resources which the small cells will use for transmitting the EPDCCH through the backhaul signaling. In this case, the information on the resource which each small cell will use for transmitting the EPDCCH may include information described below.

- PRB (group) index field: Information on an entire or partial PRB region in which the EPDCCH may be transmitted. The field may mean an index of EPDCCH-PRB-set.
- Subframe interval and offset field: Positional information of a subframe which may transmit the EPDCCH in an PRB region indicted through the PRB (group) index field. When the PRB (group) index field is not present, the corresponding field may indicate the positional information of the subframe which may transmit the EPDCCH in the entire PRB region.

Meanwhile, each UE may attempt to receive the EPDCCH through the corresponding small cell in the subframe which may receive the EPDCCH from the small cell (that is, cross carrier scheduling is not used) and attempt to receive the EPDCCH through the macro cell (primary cell) in the subframe which may not transmit onto the small cell (the cross carrier scheduling is used). For example, when the first UE 100a uses the macro cell 200 as the primary cell and uses the first small cell 300a as the secondary cell as illustrated in FIG. 12A, the first small cell 300a, that is, the secondary cell may transmit the EPDCCH at a cycle of a subframes (for example, subframe k, subframe k+a, subframe k+2a, and the like). In this case, the first UE 100a may attempt to receive the EPDCCH without applying the cross carrier scheduling in the subframe (for example, subframe k, subframe k+a, subframe k+2a, and the like) which may receive the EPDCCH from the first small cell 300a, that is, the secondary cell as illustrated in FIG. 12B. On the contrary, the first UE 100a may attempt to receive the EPDCCH from the macro cell, that is, the primary cell by applying the cross carrier scheduling in the subframe which may not receive the EPDCCH from the first small cell 300a, that is, the secondary cell.

Figure 13:
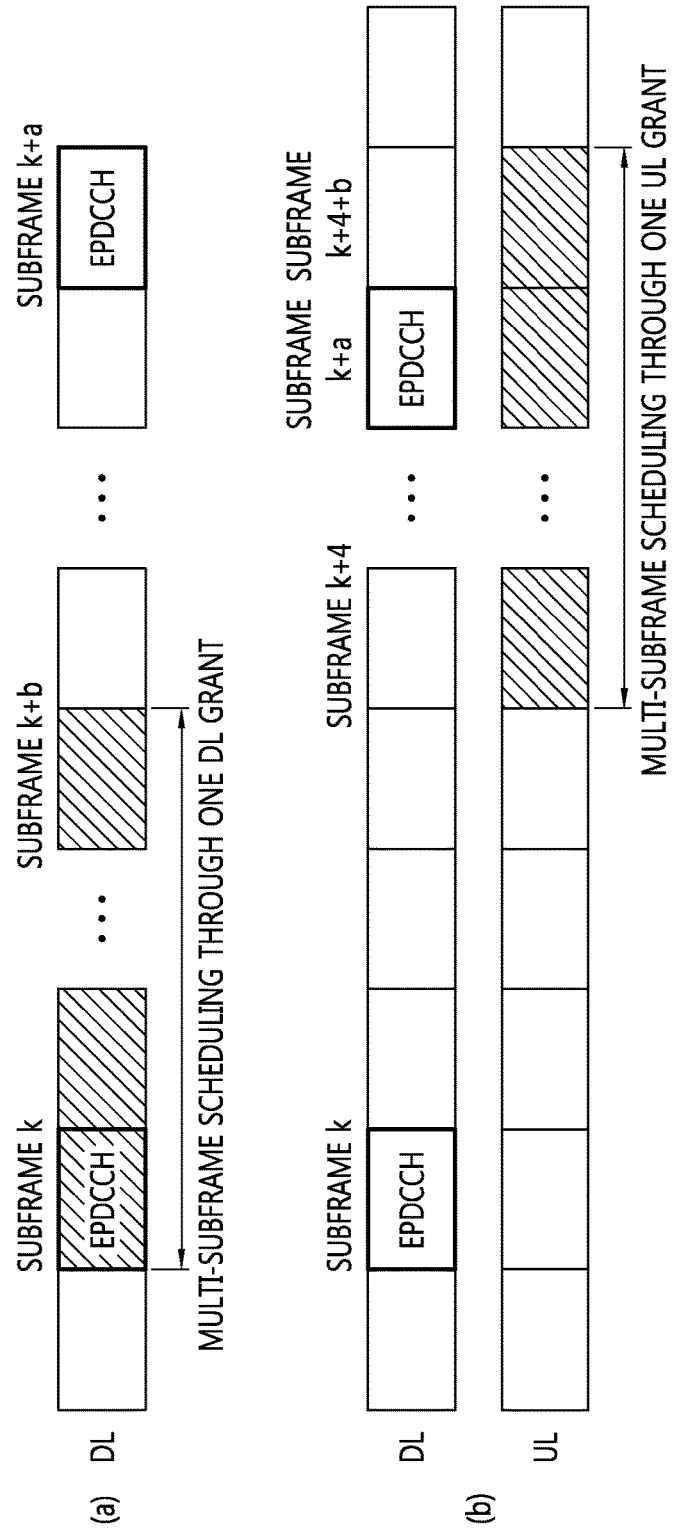
FIG. 13 illustrates one example of interference management of an EPDCCH through scheduling for multiple subframes according to a second disclosure of the present specification.

FIG. 13 illustrates one example of interference management of an EPDCCH through scheduling for multiple subframes according to a second disclosure of the present specification.

In the existing LTE, LTE-A system, only one downlink (DL) datum or uplink (UL) datum may be scheduled through one downlink (DL) grant or uplink (UL) grant and a scheme is applied, in which the corresponding DL datum or UL datum is transmitted through one DL subframe or UL subframe. Further, in the existing system, the PDSCH of the subframe of the same subframe #n may be scheduled in a DL grant transmitted onto subframe #n in the related art and a PUSCH of subframe #k+4 may be scheduled in a UL grant transmitted on subframe #k. This scheme is referred to as single-subframe scheduling.

However, as described above, according to the first disclosure of the present specification, only a predetermined cell may transmit the EPDCCH in the specific PRB (alternatively, PRB group) of the specific subframe for the EPDCCH ICIC, and as a result, a subframe in which the specific cell may schedule the PDSCH/PUSCH through the EPDCCH is restricted. In order to alleviate the problem, the second disclosure of the present specification proposes a multi-subframe scheduling scheme or a cross-subframe scheduling scheme.

The multi-subframe scheduling allows one DL grant or UL grant to simultaneously schedule a plurality of downlink data or uplink data for improvement of spectral efficiency, and the like. According to the multi-subframe scheduling scheme, the corresponding plurality of downlink data or uplink data may be sequentially transmitted through a plurality of predetermined DL/UL subframes.

According to the cross-subframe scheduling scheme, the DL grant transmitted onto subframe #k may schedule the PDSCH transmitted onto a subframe other than subframe #n. Similarly, the UL grant transmitted onto subframe #k may schedule the PUSCH other than #k+4.

Therefore, when the cell capable of transmitting the EPDCCH may be designated differently by the unit of the subframe according to the first disclosure, the specific cell may transmit the UL grants or UL grants for the plurality of subframes onto subframe #k through the multi-subframe scheduling.

For example, when a subframe in which the specific cell may transmit the EPDCCH after subframe #k is subframe k+a as illustrated in FIG. 13A, in the DL grant which the corresponding cell transmits onto subframe #k, the subframe which may be scheduled through the multi-subframe scheduling scheme may include 6 (b<=a) consecutive subframes from subframe #k. In this case, the subframe which the DL grant which the corresponding cell transmits onto subframe #k may schedule may include a consecutive subframes from subframe #k.

Further, when the subframe in which the specific cell may transmit the EPDCCH after subframe #k is subframe k+a as illustrated in FIG. 13B, the subframe which the UL grant which the specific corresponding cell transmits onto subframe #k may schedule may include b (b<=a) consecutive subframes from subframe #k+4. In this case, the subframe which the UL grant which the specific cell transmits onto subframe #k may schedule may include a consecutive subframes from subframe #k+4.

Figure 14:
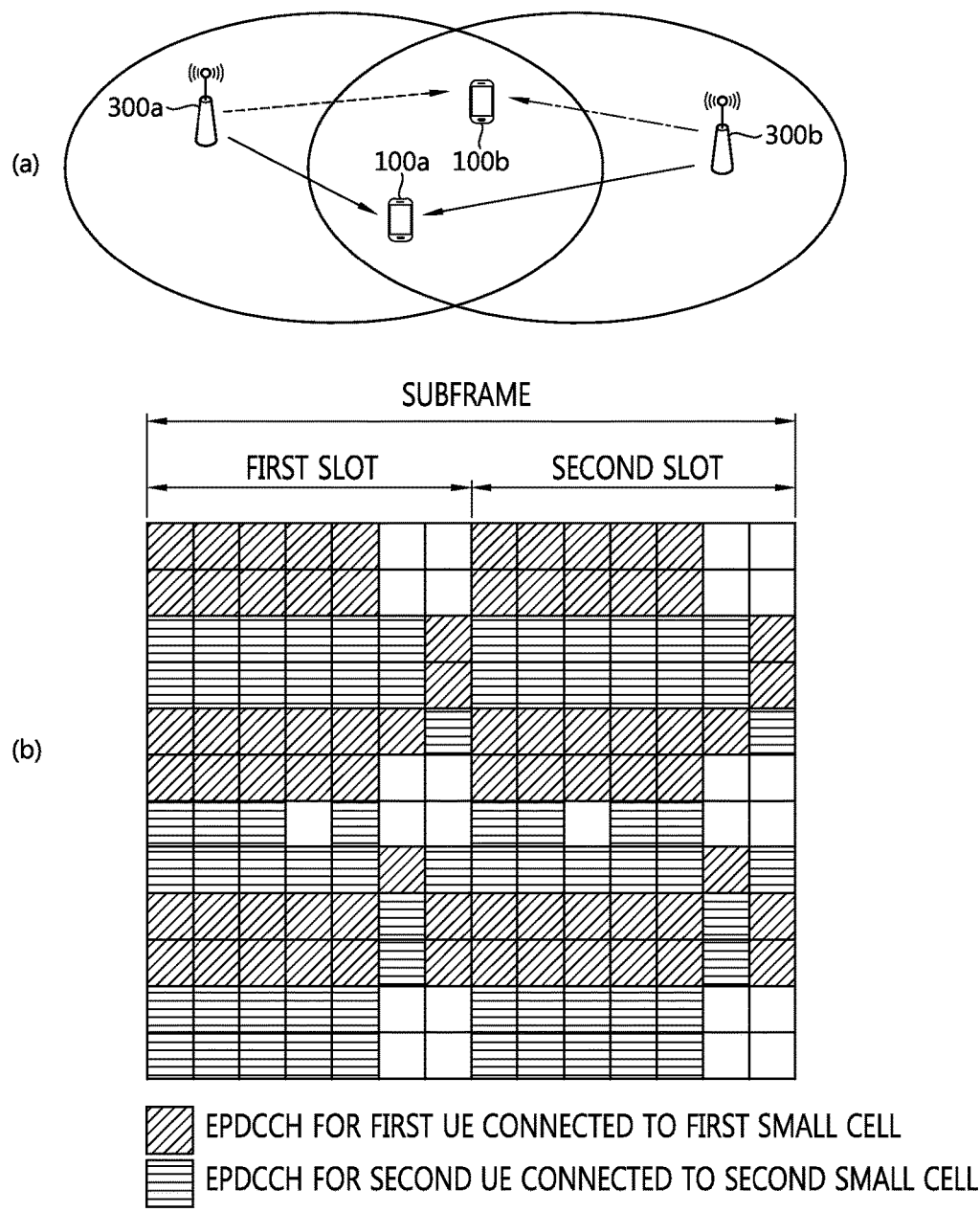
FIG. 14 illustrates one example related to interference management of an EREG/ECCE unit based EPDCCH according to a third disclosure of the present specification.

FIG. 14 illustrates one example related to interference management of an EREG/ECCE unit based EPDCCH according to a third disclosure of the present specification.

In order to reduce the interference by the EPDCCH among the cells, it may be considered that resources of the EPDCCH transmitted by multiple cells do not overlap with each other in the specific PRB.

Referring to FIG. 14A, the first small cell 300a and the second small cell 300b are under the coexistence channel environment and the first small cell 300a transmits the EPDCCH to the first UE 100a and the second small cell 300b transmits the EPDCCH to the second UE 100b. In this case, the first small cell 300a and the second small cell 300b transmit the EPDCCH through resources which do not overlap with each other to minimize the interference which is applied to each other.

In this case, each cell may not transmit the EPDCCH onto an RE resource in which another cell transmits the EPDCCH and further, each cell may perform the zero-power transmission while not transmitting another signal/channel. In this case, each cell may perform the zero-power transmission while not transmitting another signal/channel other than the CRS or tracking reference signal (TRS) onto the RE resource in which another cell transmits the EPDCCH.

Figure 15:
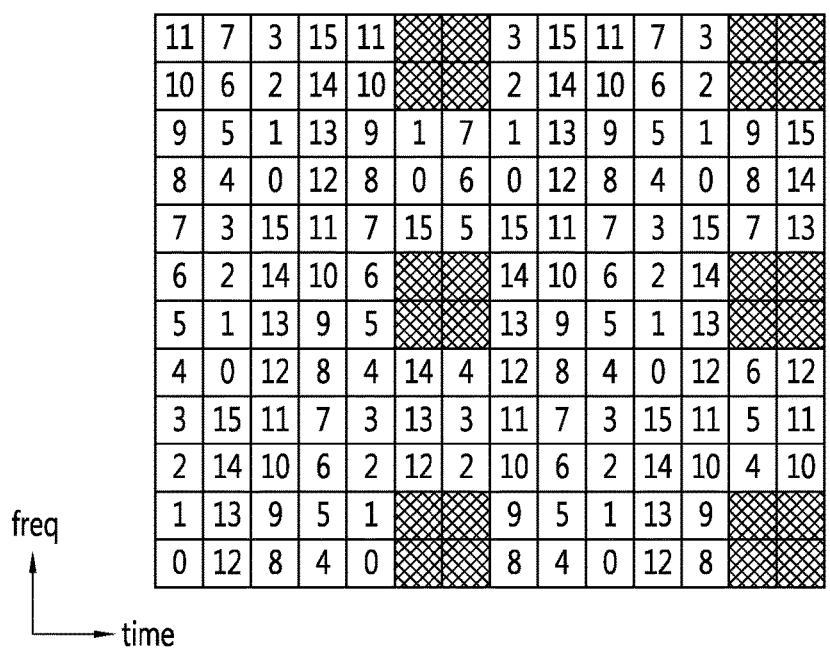
FIG. 15 illustrates one example related to the interference management of the EREG unit based EPDCCH according to the third disclosure of the present specification.

FIG. 15 illustrates one example related to the interference management of the EREG unit based EPDCCH according to the third disclosure of the present specification.

In the current LTE-A system, when an aggregation level of the EPDCCH is L, one EPDCCH transmission resource configured as L includes L ECCE sets. In this case, one ECCE is constituted BY 4 EREGs, and as a result, one EREG is constituted by 9 REs. One PRB is constituted by a total of 16 EREGs and REs included in each EREG in one PRB is illustrated in FIG. 15. 9 REs marked with the same numeral figure in FIG. 15 are included in one EREG and one PRB includes a total of 16 EREGs from an EREG constituted by REs marked by 0 to an EREG constituted by REs marked by 15.

Accordingly, according to the third disclosure, in the entire or partial PRB in which one cell may transmit the EPDCCH, the EPDCCH may be transmitted by using only EREGs among 16 EREGs included in one PRB. In this case, when M cells perform the EPDCCH ICIC together, EREGs which each cell may use the EPDCCH may be determined not to overlap with each other in on PRB. For example, when M cells having the cell index m=0, 1, ..., M−1 attempt the EPDCCH ICIC in the specific RB, an index k of the EREG in which the cell having the cell index m may transmit the EPDCCH may be determined according to k=m+M*i (where, i=0, 1, ..., 16/M). Alternatively, the index k of the EREG in which the cell having the cell index m may transmit the EPDCCH may be determined according to k=(16/M)*m+i (where, i=0, 1, ..., 16/M).

Additionally, the index of the EREG which each cell may use for transmitting the EPDCCH in the specific PRB may be determined differently for each subframe. For example, when the index of the EREG which the specific cell may use for transmitting the EPDCCH in the specific subframe is k_1, k_2, ..., k_R, the index of the EREG which the specific cell may use for transmitting the EPDCCH in a next subframe may be (k_1+1)mod 16, (k_2+1)mod 16, ..., (k_R+1)mod 16. In more detail, for example, the index k of the EREG in which the cell having the cell index m may transmit the EPDCCH in subframe #n may determined according to k=((m+n)mod M)+M*i, (where, i=0, 1, ..., 16/M) or k=(16/M)*((m+n)mod M)+i (where, i=0, 1, ..., 16/M).

Alternatively, the index of the EREG which each cell may use for transmitting the EPDCCH may be determined differently for each PRB in one subframe. For example, when the index of the EREG which the specific cell may use for transmitting the EPDCCH in the specific PRB is k_1, k_2, ..., k_R, the index of the EREG which the specific cell may use for transmitting the EPDCCH ion a next PRB may be (k_1+1)mod 16, (k_2+1)mod 16, ..., (k_R+1)mod 16. For example, the PRB index is p, the cell index k of the EREG in which the EPDCCH may be transmitted in PRB #P may determined according to k=((m+p)mod M)+M*i (where, i=0, 1, ..., 16/M) or k=(16/M)*((m+p)mod M)+I (where, i=0, 1, ..., 16/M).

As described above, when a plurality of small cells which cause interference with each other are present, each cell may adjust the EREG resource to be used for transmitting the EPDCCH through the backhaul signaling in order to perform the EPDCCH ICIC technique. Alternatively, the macro cell and the small cells which cause the interference with each other coexist in the same region and under an environment in which the corresponding small cells serves to assist the macro cell, the macro cell will use the EREG resource for transmitting the EPDCCH may be announced to each of the small cells through the backhaul signaling in order to perform the EPDCCH ICIC technique.

Figure 16C:
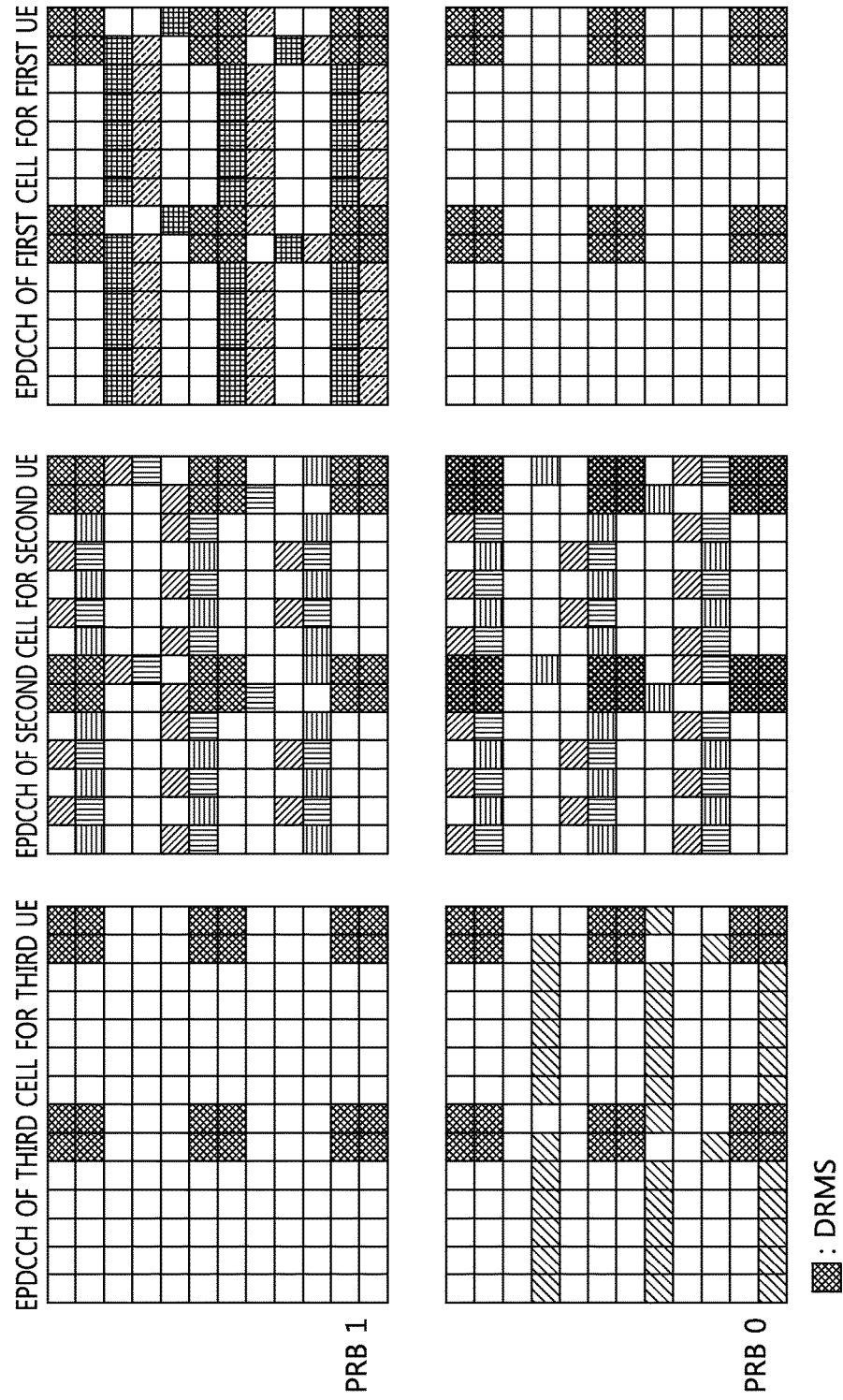

FIGS. 16A to 16C illustrate one example related to the interference management of the ECCE unit based EPDCCH according to the third disclosure of the present specification.

According to the third disclosure, in the entire or partial PRB in which the EPDCCH may be transmitted, one cell may transmit the EPDCCH by using only some ECCEs among 4 ECCEs included in one PRB. Therefore, the plurality of cells may prevent the ECCE resources used for transmitting the EPDCCH from overlapping with each other.

In the present specification, for easy description, a set of 4 EREG indexes are defined as described below.

EREG set 0={0, 4, 8, 12},
EREG set 1={1, 5, 9, 13},
EREG set 2={2, 6, 10, 14},
EREG set 3={3, 7, 11, 15}

4 EREG sets are illustrated in FIG. 16A. Numerical figures marked in each RE represent indexes of the EREG sets. The REs marked by the same numerical figure belong to the same EREG set. As defined above with reference to FIG. 16A, EREG set 0 includes EREG #0, #4, #8, and #12.

When an aggregation level for one EPDCCH is L, one EPDCCH-PRB-set includes L ECCEs. Accordingly, ECCEs for the specific cell to transmit the EPDCCH may include only ECCEs described below.

First, L ECCEs for the specific cell to transmit the EPDCCH may include only all or some EREGs among the EREGs included in the EREG set. For example, in the case where M cells having the cell index m=1, ..., M attempt the EPDCCH ICIC, when the ECCEs for the cell having the cell index m to transmit the EPDCCH are EREG_SET_m, EREG_SET_m, m=1, ..., M may need to satisfy conditions given below.

i) EREG_SET_m (where, m=1, ..., M) is a union of some or all sets among four sets of EREG set 1, EREG set 2, EREG set 3, and EREG set 4.

ii) EREG_SET_∩EREG_SET_n=ϕ (where, m≠n, m=1, 2, ..., M, n=1, 2, ..., M)

That is, according to the above conditions, when the EREG_SET_m for the cell having the cell index m is the same as a union of EREG set 1 and EREG set 2, the ECCEs for the EPDCCH for the corresponding cell need to be transmitted onto all or some REs among the REs marked with 0 and 1 among the REs illustrated in FIG. 16A.

As another example, referring to FIG. 16B, when two cells, for example, a first cell and a second cell perform the EPDCCH ICIC, it may be configured like EREG_SET_1=EREG set 1∪EREG set 2 and EREG_SET_2=EREG set 3∪EREG set 4. In this case, when the first cell transmits the EPDCCH to the first UE and the second UE and the second cell transmits the EPDCCH to the third UE, the first cell may transmit the EPDCCHs of the first UE and the second UE by using the EREGs included in EREG_SET_1 as illustrated in FIG. 16B. Further, the second cell may transmit the EPDCCH of the third UE by using the EREGs included in EREG_SET_2. In this case, a transmission region of the EPDCCH used by the first cell and a transmission region of the EPDCCH used by the second cell do not overlap with each other.

As yet another example, when three cells, for example, the first cell, the second cell, and the third cell are present as illustrated in FIG. 16C, in the case where the PRB regions used for the first cell and the third cell to transmit the EPDCCH do not overlap with each other, EREG_SET_1 and EREG_SET_2 may include sets which overlap with each other. In more detail, as illustrated in FIG. 16C, EREG_SET_1 and EREG_SET_2 may include sets which overlap with each other like EREG_SET_1=EREG set 1, EREG_SET_2=EREG set 3∪EREG set 4, and EREG_SET_3=EREG set 1∪EREG set 2.

Figure 17:
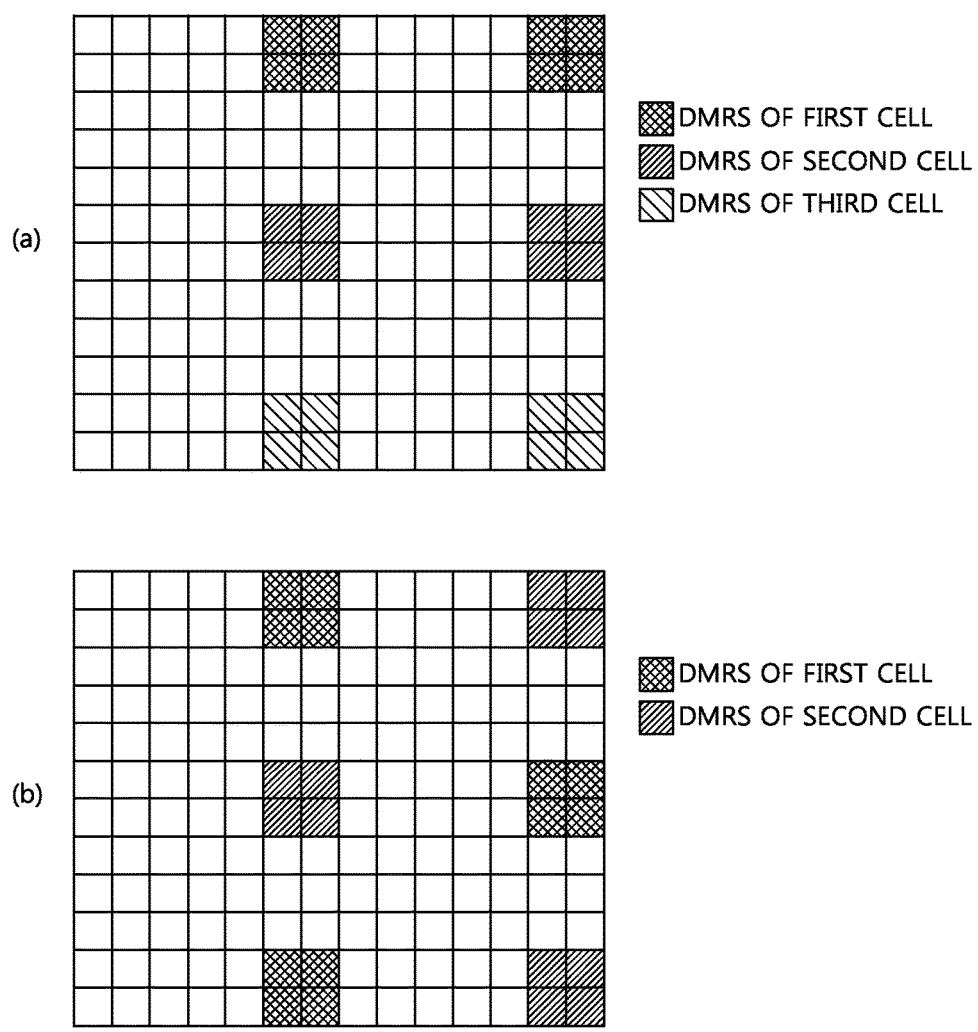
FIG. 17 illustrates an example of managing a DMRS resource for efficient interference management of an EPDCCH according to a fourth disclosure of the present specification.

FIG. 17 illustrates an example of managing a DMRS resource for efficient interference management of an EPDCCH according to a fourth disclosure of the present specification.

As described above, in the case where M cells transmit the EPDCCH onto the same PRB, the EPDCCH ICIC may be attempted by differentiating the resources of the EPDCCH which are transmitted to each other. However, in order to more efficiently perform the EPDCCH ICIC, the resources of the DMRS transmitted by the respective cells may also be prevented from overlapping with each other. The fourth disclosure will be described below in detail.

First, in the case of distributed transmission of the EPDCCH, when two cells perform the EPDCCH ICIC, DMRS ports 107 and 109 may be used for the first cell and DMRS ports 108 and 110 may be used for the second cell. In this case, the EPDCCHs of a maximum of two cells per PRB may be multiplexed.

Further, in the case of localized transmission of the EPDCCH, the sum of the numbers of DMRS ports of N cells transmitting the EPDCCH in the specific PRB may be equal to or smaller than 4. Alternatively, the number of DMRS ports of the N cells transmitting the EPDCCH in the specific PRB may be equal to or smaller than 4/N. In this case, the EPDCCHs of a maximum of four cells per PRB may be multiplexed.

In the case where M cells transmit the EPDCCH onto the same PRB as described above, the DMRS RE resources transmitted by the respective cells are divided in the corresponding PRB to prevent the DMRS resources used by the respective cells from overlapping with each other. When 6 DMRS REs for one port are present in one PRB, in the case where M cells transmit the EPDCCH on the same PRB, 6/M DMRS REs per port may be used for each cell.

For example, in the case where three cells, for example, the first cell, the second cell, and the third cell transmit the EPDCCH in the same PRB, the DMRS RE resources used by the respective cells may be divided as illustrated in FIG. 17A.

As still yet another example, in the case where two cells, for example, the first cell and the second cell transmit the EPDCCH in the same PRB, the DMRS RE resources used by the respective cells may be divided as illustrated in FIG. 17B.

Figure 18:
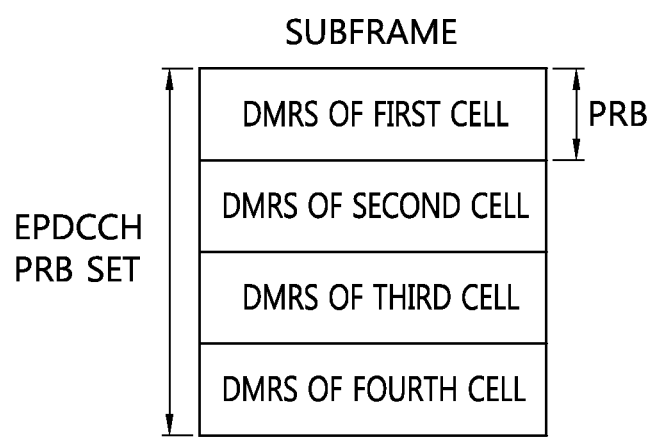
FIG. 18 illustrates another example of managing a DMRS resource for efficient interference management of an EPDCCH according to a fourth disclosure of the present specification.
Figure 19:
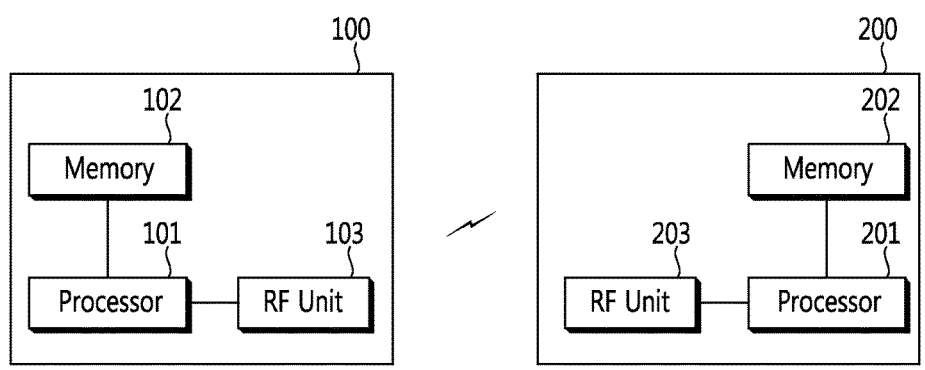
FIG. 19 is a block diagram illustrating a wireless communication system according to an embodiment of the present invention.

FIG. 18 illustrates another example of managing a DMRS resource for efficient interference management of an EPDCCH according to a fourth disclosure of the present specification.

As illustrated in FIG. 18, in the case where the specific UE receives the EPDCCH on a specific PRB set/PRB bundle/PRB group, the DMRS used for demodulating the EPDCCH for the corresponding UE may be received through a partial PRB region of the EPDCCH PRB set/PRB bundle/PRB group in which the EPDCCH is received. As a detailed example, as illustrated in FIG. 18, in the case where the EPDCCH PRB set/PRB bundle/PRB group in which the EPDCCH is transmitted is constituted by 4 PRBs and four cells transmit the EPDCCH to the respective UEs through the corresponding PRB region, cell #n may transmit the DMRS through PRB region #(n mod 4). Further, in the EPDCCH PRB set/PRB bundle/PRB group in which the EPDCCH is transmitted, the PRB region for the specific cell to transmit the DMRS may be configured differently for each subframe index.

Alternatively, the PRB region in which the DMRS which the specific UE will use for demodulating the specific EPDCCH is received may be configured apart from the PRB region in which the EPDCCH is transmitted to the corresponding UE. In this case, the PRB region in which the DMRS which the specific UE will use for demodulating the specific EPDCCH is transmitted may be configured semi-fixedly from the corresponding cell or configured differently for each subframe (alternatively, bundle of the subframe). Alternatively, the PRB region in which the DMRS to be used for demodulating the specific EPDCCH is transmitted may be configured simultaneously when the EPDCCH-PRB-set is configured to the UE.

The aforementioned embodiments of the present invention can be implemented through various means. For example, the embodiments of the present invention can be implemented in hardware, firmware, software, combination of them, etc. Details thereof will be described with reference to the drawing.

[FIG. 8] 19 is a block diagram illustrating a wireless communication system according to an embodiment of the present invention.

The base station (BS) 200/300 includes processor 201/301, memory 202/302, and radio frequency (RF) unit 203/303. The memory 202/302 coupled with the processor 201/301 stores a variety of information for driving the processor 201/301. The RF unit 203/303 coupled to the processor 201/301 transmits and/or receive radio signals. The processor 201/301 implements the proposed functions, procedures, and/or methods. In the aforementioned embodiment, an operation of the BS may be implemented by the processor 201/301.

The MTC device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving an enhanced physical downlink control channel (EPDCCH) from a cell having low-power transmission power, the method performed by terminal and comprising:
receiving EPDCCH-physical resource block (PRB) set information including information about a PRB on which the EPDCCH is to be received from the cell;
determining a subframe in which the EPDCCH is to be received based on the PRB in the EPDCCH-PRB set information from the cell,
wherein the subframe in which the EPDCCH is to be received from the cell has an index k satisfying m=(k mod M),
wherein M means the total number of the cell and neighboring cells, and
wherein m means a cell index of the cell; and
receiving and demodulating the EPDCCH on the determined subframe.

2. The method of claim 1, wherein the PRB on which the EPDCCH is to be received is determined by the unit of a set of PRBs, a bundle of PRBs, or a group of PRBs.

3. The method of claim 1, wherein in a subframe other than the subframe determined to receive the EPDCCH, zero-power transmission is performed by the cell on the PRB.

4. The method of claim 1, wherein in the subframe determined to receive the EPDCCH from the cell, the zero-power transmission is performed by one or a plurality of neighboring cells.

5. A method for transmitting an enhanced physical downlink control channel (EPDCCH) from a cell having low-power transmission power, the method performed by a base station and comprising:
determining a physical resource block (PRB) on which the cell is to transmit the EPDCCH; and
determining a subframe in which the cell is to transmit the EPDCCH on the determined PRB,
wherein the subframe has an index k satisfying m=(k mod M),
wherein M means the total number of the cell and neighboring cells, and
wherein m means a cell index of the cell; and
modulating and transmitting the EPDCCH on the determined subframe.

6. The method of claim 5, wherein the PRB on which the EPDCCH is transmitted is determined by the unit of a set of PRBs, a bundle of PRBs, or a group of PRBs.

7. The method of claim 5, further comprising:
transmitting to a terminal EPDCCH-PRB set information including information about a PRB on which the cell is to transmit the EPDCCH.

8. The method of claim 5, wherein in a subframe other than the subframe determined to transmit the EPDCCH, zero-power transmission is performed by the cell on the PRB.

9. The method of claim 5, wherein in the subframe determined to transmit the EPDCCH, the zero-power transmission is performed by one or a plurality of neighboring cells.

10. A terminal for receiving an enhanced physical downlink control channel (EPDCCH) from a cell having low-power transmission power, the terminal comprising:
a receiver that receives EPDCCH-physical resource block (PRB) set information including information about a PRB on which the EPDCCH is received from the cell; and
a processor that determines a subframe in which the EPDCCH is to be received based on the PRB in the EPDCCH-PRB set information,
wherein the subframe in which the EPDCCH is received from the cell has an index k satisfying m=(k mod M),
wherein M means the total number of the cell and neighboring cells, and
wherein m means a cell index of the cell;
wherein the receiver receives and the processor demodulates the EPDCCH on the determined subframe.

11. The terminal of claim 10, wherein in a subframe other than the subframe determined to receive the EPDCCH, zero-power transmission is performed by the cell on the PRB.

12. The terminal of claim 10, wherein in the subframe determined to receive the EPDCCH from the cell, the zero-power transmission is performed by one or a plurality of neighboring cells.

* * * * *